(No Model.)
J. B. JONES.
FAUCET.
No. 413,518. Patented Oct. 22, 1889.
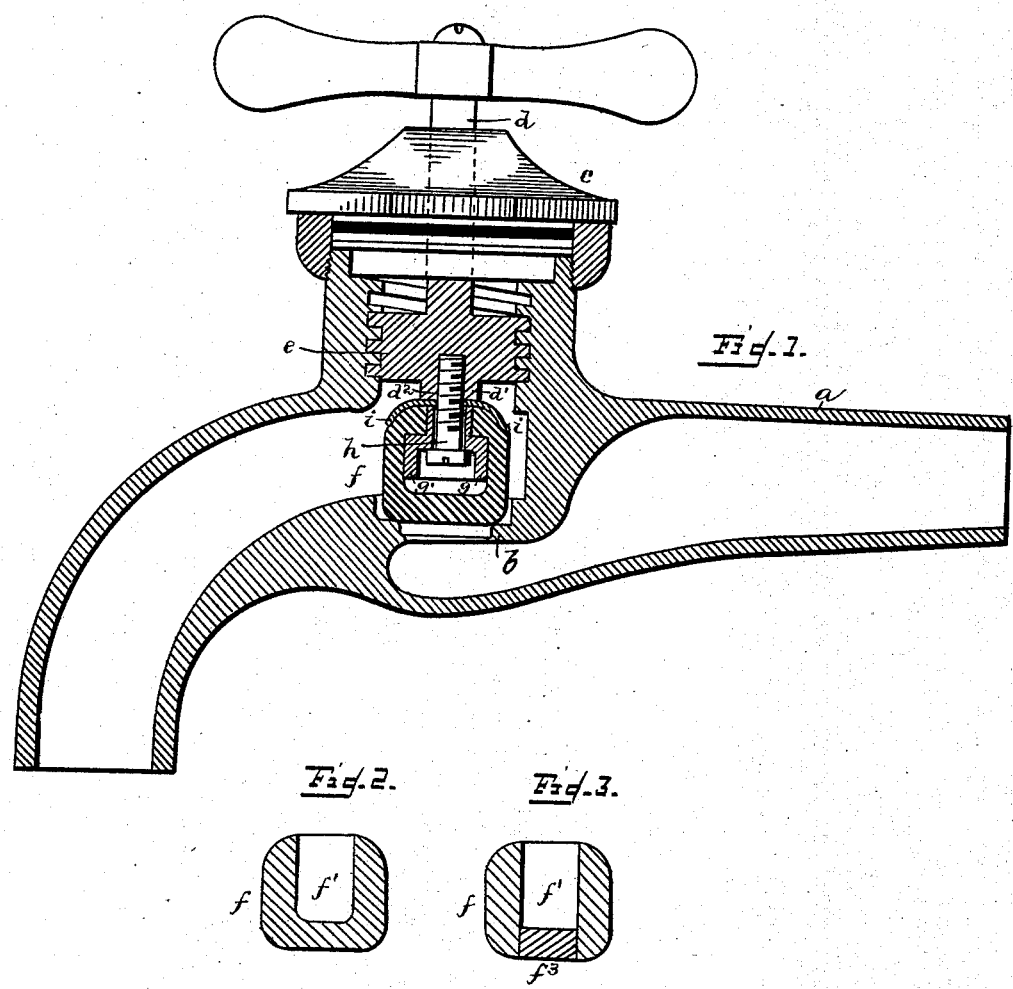
Witnesses
Ira R. Steward
William R. McKrville
Inventor
John B. Jones
By his Attorney
Ernest C. Webb

UNITED STATES PATENT OFFICE.

JOHN B. JONES, OF BROOKLYN, NEW YORK.

FAUCET.

SPECIFICATION forming part of Letters Patent No. 413,518, dated October 22, 1889.

Application filed January 23, 1889. Serial No. 297,314. (No model.)

*To all whom it may concern:*

Be it known that I, JOHN B. JONES, a citizen of the United States, residing at Brooklyn, in the county of Kings and State of New York, have invented certain new and useful Improvements in Faucets, of which the following is a full, clear, and exact description.

The object of this invention is to provide a compressible valve or plug for faucets which, while seating fluid-tight, will not after being so seated rotate with the spindle in its further movement.

The invention consists of a compressible or elastic or resilient valve or plug swiveled to the stem and constructed and arranged substantially as hereinafter more particularly set forth and claimed.

In the accompanying drawings, illustrating my invention, in the several figures of which like parts are similarly designated, Figure 1 is a longitudinal section. Fig. 2 is a section of the valve detached, and Fig. 3 is a section of the valve detached, showing a modification.

$a$ is the usual shell or casing, provided with a septum $b$ and the bonnet $c$, as usual. The spindle $d$ is provided with the screw-threaded portion $e$ to engage the similar screw-threaded portion of the casing $a$. The spindle is prolonged slightly beyond the screw-threaded portion $e$ to form a shoulder $d'$, which is threaded internally, as at $d^2$. The valve or plug $f$ is made of rubber and of shape and size to fit the seat and the shell of the faucet to which it is to be applied. Preferably this valve is made hollow and its upper end is made with an opening $f'$.

$g$ is a flanged thimble suspended from the spindle by means of the screw $h$, which enters the screw-threaded portion $d^2$ of the spindle. The thimble $g$ freely rotates around the screw $h$. Above the thimble and freely encircling the screw $h$ is a cap $i$, of substantially the outline of the upper end of the valve and rather smaller, so as to bind the said valve when placed therein. The valve is secured to the thimble $g$ by spreading its opening $f'$ and slipping it up over the flange $g'$. Some little force will be required to insert the valve between the said flange and the cap $i$, and when so secured the valve will revolve or move with the said thimble and cap. Inasmuch as the thimble and cap are secured freely and loosely to the spindle by means of the screw $h$, it follows that when the spindle has borne the valve down to its seat any further downward movement of the spindle will not affect the rotation of the valve, but will simply compress it. By reason of this compression the grinding wear of the rotating valve is avoided. Making the valve hollow provides for the extensive compression of the valve by the descent of the spindle, but there will be no real compression of the solid substance of the valve; hence the valve may be closed effectually with but slight pressure and with very little wear.

Instead of making the valve entirely of rubber, it may be made of a section of rubber tubing, with the lower end closed by means of a disk of leather or other suitable substance, compressed or otherwise secured in the tube. Such a construction is illustrated in Fig. 3, in which the valve $f$ is composed of a tube $f^2$, having the inserted bottom $f^3$.

What I claim is—

1. A faucet composed of a shell $a$, having a septum $b$, a bonnet $c$, and a valve-spindle $d$, and a hollow compressible valve sprung over the end of the spindle and swiveled thereto, substantially as described.

2. The compressible valve $f$, swiveled to the spindle through the intervention of the flanged thimble $g$, cap $i$, and screw $h$, substantially as described.

3. The hollow compressible valve having a solid bottom and an opening in its top, combined with a valve-spindle, a flanged thimble, over which the valve is stretched, a superposed cap, and a screw connecting the valve, thimble, and cap to the spindle, substantially as described.

In testimony whereof I have hereunto set my hand this 2d day of January, A. D. 1889.

JOHN B. JONES.

Witnesses:
THORNE S. WALLING,
FREDERIC CARRAGAN.